(12) United States Patent
Bi et al.

(10) Patent No.: US 11,646,801 B1
(45) Date of Patent: May 9, 2023

(54) ANALOG FRONT-END MODULE OF ULTRA-WIDEBAND OPTICAL RECEIVER

(71) Applicant: HUAZHONG UNIVERSITY OF SCIENCE AND TECHNOLOGY, Hubei (CN)

(72) Inventors: Xiaojun Bi, Hubei (CN); Chaodi Sheng, Hubei (CN)

(73) Assignee: HUAZHONG UNIVERSITY OF SCIENCE AND TECHNOLOGY, Hubei (CN)

(*) Notice: Subject to any disclaimer, the term of this patent is extended or adjusted under 35 U.S.C. 154(b) by 0 days.

(21) Appl. No.: 18/076,414

(22) Filed: Dec. 7, 2022

(30) Foreign Application Priority Data

Mar. 10, 2022 (CN) .......................... 202210230415.2

(51) Int. Cl.
*H04B 10/61* (2013.01)
*H04B 10/64* (2013.01)

(52) U.S. Cl.
CPC ........... *H04B 10/612* (2013.01); *H04B 10/64* (2013.01)

(58) Field of Classification Search
CPC .............................. H04B 10/612; H04B 10/64
USPC ....................................................... 398/202
See application file for complete search history.

(56) References Cited

U.S. PATENT DOCUMENTS

| | | | | |
|---|---|---|---|---|
| 4,574,249 A | * | 3/1986 | Williams | H04B 10/6931 330/59 |
| 10,958,355 B2 | * | 3/2021 | Tatsumi | H04B 10/6931 |
| 2013/0342275 A1 | * | 12/2013 | Takemoto | H03F 3/45744 330/254 |
| 2023/0051839 A1 | * | 2/2023 | Sahota | H03H 11/42 |

FOREIGN PATENT DOCUMENTS

| | | | | |
|---|---|---|---|---|
| CN | 106027159 A | * | 10/2016 | |
| KR | 20200017673 A | * | 2/2019 | ............. G01S 17/26 |
| WO | WO-2019149688 A1 | * | 8/2019 | ............. G01S 17/26 |

OTHER PUBLICATIONS

Naidu et al; analog front end module of an ultra-wideband optical receiver with transimpedance amplifier and matching load at the output, May 2022, MDPI, pp. 1-16. (Year: 2022).*

* cited by examiner

*Primary Examiner* — Amritbir K Sandhu
(74) *Attorney, Agent, or Firm* — JCIPRNET

(57) ABSTRACT

An analog front-end module of an ultra-wideband optical receiver including a transimpedance amplifying unit and a distributed amplifier unit is provided. The transimpedance amplifying unit is configured to convert an externally-inputted current signal into a voltage signal, amplify the voltage signal, and then output a voltage-amplified signal.

The distributed amplifier unit includes an input transmission network, an input matching load, an output transmission network, an output matching load, and a plurality of gain units. The input transmission network is configured to receive the voltage-amplified signal and distribute the voltage-amplified signal to each gain unit for further amplification. The input matching load is configured to absorb the voltage-amplified signal reflected to the transimpedance amplifying unit.

The output transmission network is configured to superimpose amplified signals outputted from the gain units and output in combination. The output matching load is configured to absorb the amplified signals transmitted in an opposite direction.

10 Claims, 8 Drawing Sheets

ANALOG FRONT-END MODULE OF ULTRA-WIDEBAND OPTICAL RECEIVER

CROSS-REFERENCE TO RELATED APPLICATION

This application claims the priority benefit of China application serial no. 202210230415.2, filed on Mar. 10, 2022. The entirety of the above-mentioned patent application is hereby incorporated by reference herein and made a part of this specification.

BACKGROUND

Technical Field

The disclosure belongs to the field of analog and radio frequency amplifiers, and in particularly, relates to an analog front-end module of an ultra-wideband optical receiver.

Description of Related Art

With the rapid development of broadband services such as cloud computing and 4K ultra-high-definition videos, the demand for faster communication speeds continues to grow. In order to meet sufficient data throughput capacity, optical fiber transmission systems featuring ultra-high speed and ultra-large capacity are constantly updated and iterated. The analog front end of the optical receiver is the first stage of the receiving end in the optical fiber communication. Therefore, its operating speed dominates the communication speed of the system. Hence, research on the analog front end of the ultra-wideband optical receiver is of great significance.

At present, most of the analog front ends of optical receivers use a lumped circuit architecture in which transimpedance amplifiers are cascaded with post-stage amplifiers. For instance, in the front-end architecture of the broadband optical receiver provided by Chinese invention patent CN107147448A, a lumped-circuit amplifier architecture formed by a transimpedance amplifier, a limiting amplifier, and an output buffer is used. The characteristic of this lumped circuit architecture is that the front-end circuit is a cascade of multiple amplifier circuits with independent functions. The disadvantage of this solution is that the multi-stage cascade structure may affect the overall bandwidth of the analog receiving front end. According to the method of calculating the cascaded bandwidth of an ideal amplifier, the cascaded bandwidth of the overall system is inversely proportional to the square root of the number of cascaded single-stage amplifiers. Therefore, it is difficult to achieve an analog bandwidth of more than 100 GHz with such a lumped circuit multi-stage amplifiers in cascade.

SUMMARY

In view of the defects of the related art, the disclosure aims to provide an analog front-end module of an ultra-wideband optical receiver capable of effectively improving the overall bandwidth performance of the analog front-end module of the optical receiver.

To achieve the above, the disclosure provides an analog front-end module of an ultra-wideband optical receiver including a transimpedance amplifying unit and a distributed amplifier unit.

The transimpedance amplifying unit is configured to convert an externally-inputted current signal into a voltage signal, amplify the voltage signal, and then output a voltage-amplified signal.

The distributed amplifier unit includes an input transmission network, an input matching load, an output transmission network, an output matching load, and a plurality of gain units. The input transmission network is configured to receive the voltage-amplified signal and distribute the voltage-amplified signal to each gain unit for further amplification. The input matching load is configured to absorb the voltage-amplified signal reflected to the transimpedance amplifying unit. The output transmission network is configured to combine, and output amplified signals outputted from the gain units. The output matching load is configured to absorb the amplified signals transmitted from the gain units to an output end of the output transmission network in an opposite direction.

Compared to the conventional analog front-end module of the optical receiver, in the analog front-end module of the ultra-wideband optical receiver provided by the disclosure, the distributed amplifier unit is used to replace the conventional lumped circuit amplifier and then acts as the post-stage amplifier circuit, and the broadband characteristics of the distributed amplifier unit and the functions of the distributed amplifier unit are thus provided. That is, the functions of post-stage amplification, gain control, and output buffering are all available. The single-stage circuit bandwidth can be enhanced, the number of circuit stages of the overall system can be reduced, and extension of the overall bandwidth of the analog front end of the optical receiver is achieved.

In an embodiment, the transimpedance amplifying unit includes an inverter and a feedback resistor $R0$, and the feedback resistor $R0$ is connected in parallel with the inverter.

In an embodiment, each of the input transmission network and the output transmission network includes a plurality of series-connected inductors. One end of the inductor located at a head end in the input transmission network is connected to an output end of the transimpedance amplifying unit. One end of the inductor at a terminal end of the input transmission network is grounded through the input matching load. Connection points of two adjacent inductors in the input transmission network are correspondingly connected to input ends of the gain units. Connection points of two adjacent inductors in the output transmission network are correspondingly connected to output ends of the gain units. One end of the inductor located at a head end in the output transmission network is grounded through the output matching load. One end of the inductor at a terminal end of the output transmission network is connected to an external load.

In an embodiment, both the input transmission network and the output transmission network use transmission lines. One end of the transmission line in the input transmission network is connected to an output end of the transimpedance amplifying unit. The transmission line in the input transmission network is connected to input ends of the gain units. The other end of the transmission line in the input transmission network is grounded through the input matching load. One end of the transmission line in the output transmission network is grounded through the output matching load. The transmission line in the output transmission network is connected to output ends of the gain units. The other end of the transmission line in the output transmission network is connected to an external load.

In an embodiment, the gain units use multi-stacked amplifier circuits, and each the amplifier circuit includes bipolar transistors or field-effect transistors.

In an embodiment, the gain units are Gilbert units.

In an embodiment, the input matching load includes a resistor R1, and the impedance of the input matching load is equal to the characteristic impedance of the input transmission network.

In an embodiment, the output matching load includes a resistor R2, and the impedance of the output matching load is equal to the characteristic impedance of the output transmission network.

In an embodiment, a pre-driving unit adopting a current mode logic circuit is further included. The pre-driving unit is configured to receive the voltage-amplified signal and output a driving current signal. The driving current signal is multiplexed with the input matching load, and the driving current signal is converted into a driving voltage signal and distributed to each gain unit.

In an embodiment, the current mode logic circuit includes a MOS transistor or a BJT transistor. The gate of the MOS transistor or the base of the BJT transistor is connected to the output node of the transimpedance amplifier. The drain of the MOS transistor or the collector of the BJT transistor is connected to the input transmission network. The source of the MOS transistor or the emitter of the BJT transistor is grounded.

DESCRIPTION OF THE EMBODIMENTS

In order to make the objectives, technical solutions, and advantages of the disclosure clearer and more comprehensible, the disclosure is further described in detail with reference to the drawings and embodiments. It should be understood that the specific embodiments described herein serve to explain the disclosure merely and are not used to limit the disclosure.

Figure 1:
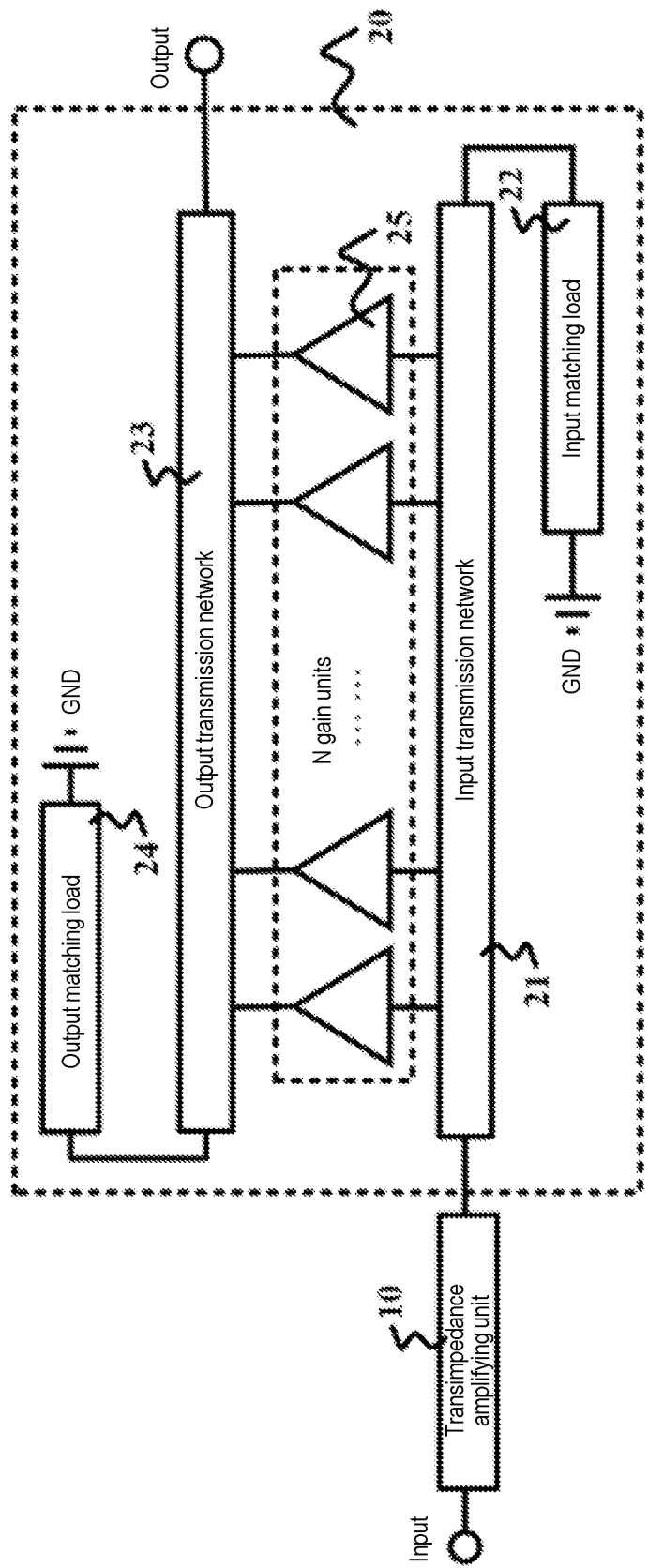
FIG. 1 is a structural diagram of an analog front-end module of an ultra-wideband optical receiver according to an embodiment of the disclosure.

In order to solve the problem of low analog bandwidth caused by the use of a lumped circuit structure in the analog front end of a conventional optical receiver, the disclosure provides an analog front-end module of an ultra-wideband optical receiver. As shown in FIG. 1, an analog front-end module of an ultra-wideband optical receiver includes a transimpedance amplifying unit 10 and a distributed amplifier unit 20.

Figure 2:
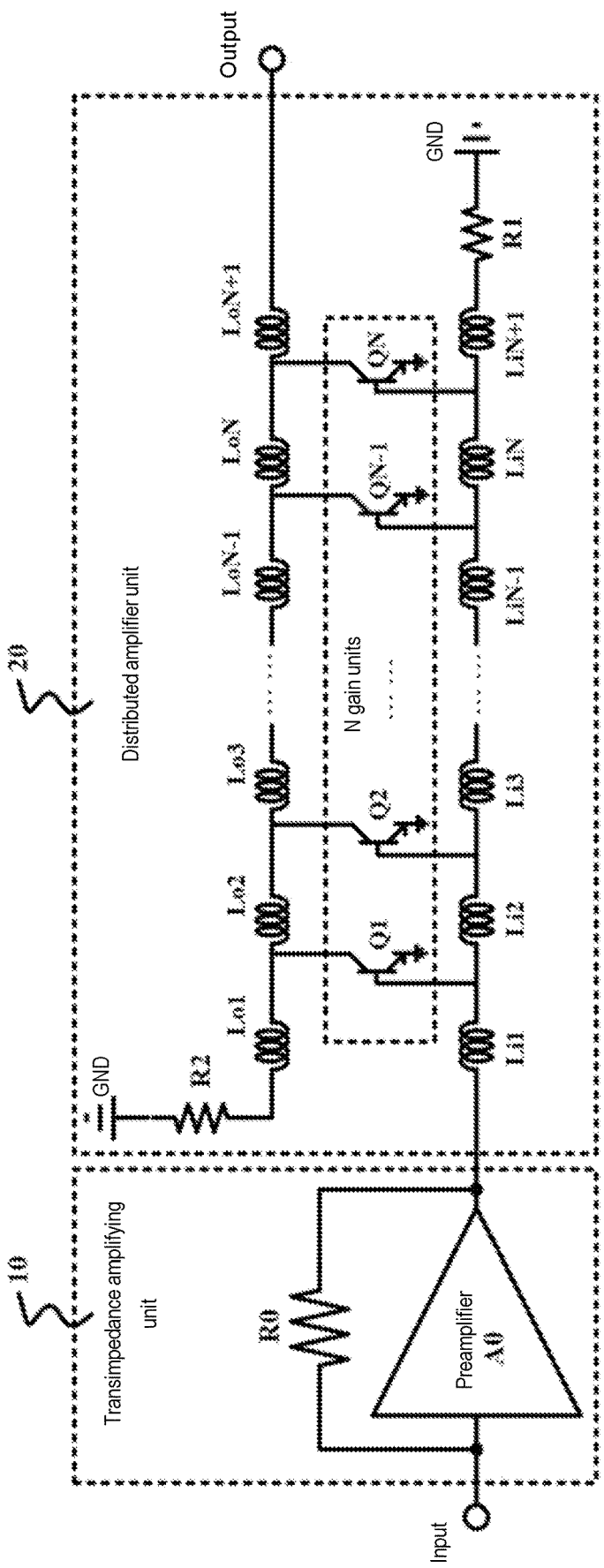
FIG. 2 is a schematic circuit diagram of the analog front-end module of the ultra-wideband optical receiver in FIG. 1.
Figure 6:
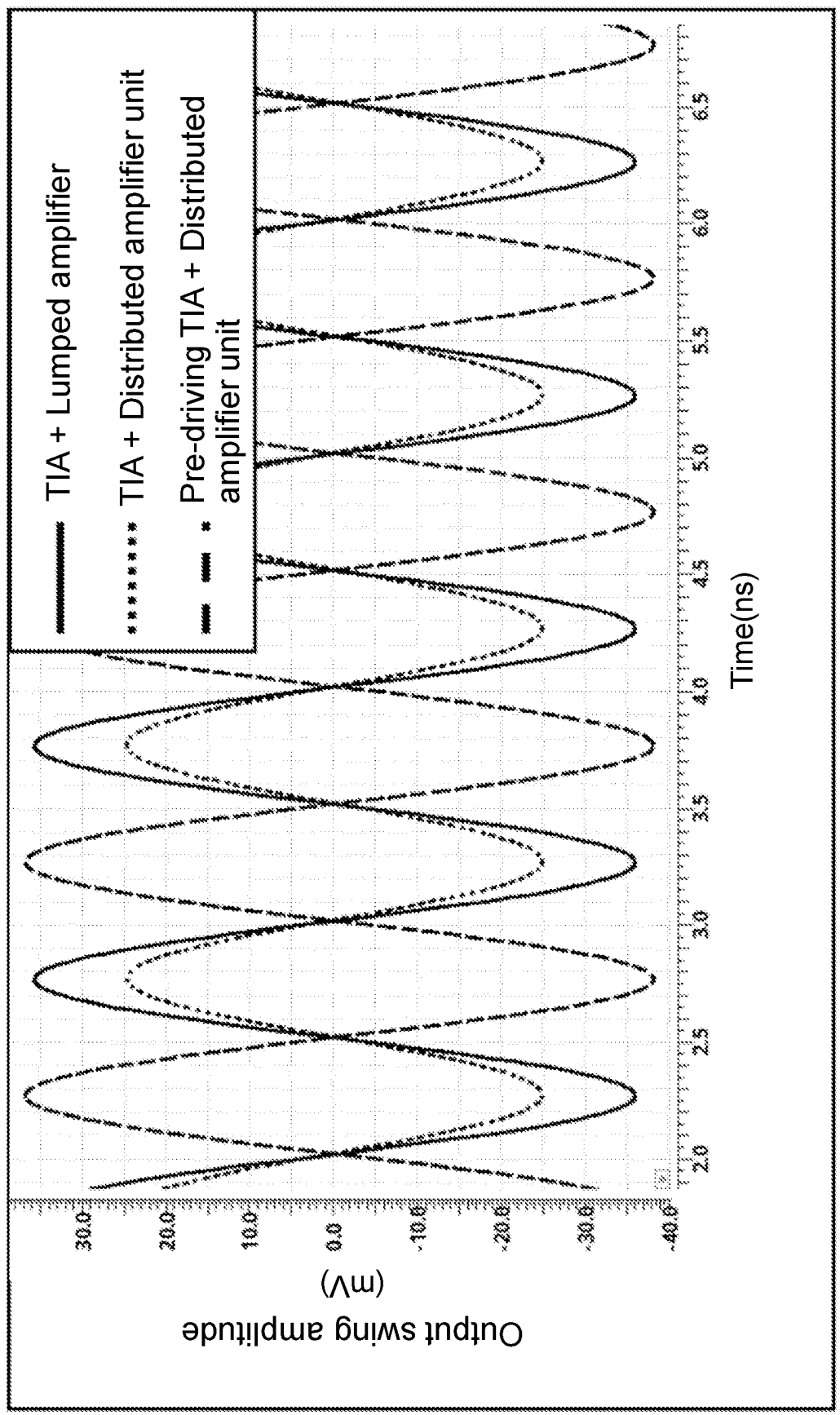
FIG. 6 is a comparison chart of simulation results of output swing amplitudes of the combination of a transimpedance amplifying unit and different post-stage circuits according to the disclosure.

Herein, the transimpedance amplifying unit 10 is configured to convert an externally-inputted current signal into a voltage signal, amplify the voltage signal, and then output a voltage-amplified signal. To be specific, as shown in FIG. 2 and FIG. 6, in this embodiment, the transimpedance amplifying unit 10 may adopt a circuit in which a preamplifier A0 and a feedback resistor R0 are connected in parallel or a circuit in which an inverter and the feedback resistor R0 are connected in parallel, which is not limited in this embodiment.

The distributed amplifier unit 20 is used to provide post-stage gain, further amplify the voltage-amplified signal, and at the same time, can provide output matching and function as a buffer.

To be specific, as shown in FIG. 1, in this embodiment, the distributed amplifier unit 20 includes an input transmission network 21, an input matching load 22, an output transmission network 23, an output matching load 24, and a plurality of gain units 25.

Herein, the input transmission network 21 is configured to receive an input signal (the voltage-amplified signal outputted by the transimpedance amplifying unit 10) and distribute the input signal to each gain unit 25 for further amplification. The input matching load 22 is configured to absorb the input signal reflected to the transimpedance amplifying unit 10, prevent the signal from being reflected to the transimpedance amplifying unit 10, and reduce the intra-stage crosstalk to the greatest extent. The output transmission network 23 is configured to combine, and output amplified signals which outputted from the gain units 25. The output matching load 24 is configured to absorb the amplified signals transmitted from the gain units to an output end of the output transmission network 23 in an opposite direction, that is, is configured to absorb the amplified signal outputted by each gain unit 25 in FIG. 1 and transmitted to the left. The amplified signal is prevented from being reflected to the output end of the output transmission network 23, and the quality of the outputted signal is improved.

It should be noted that the bandwidth of the distributed amplifier unit 20 using the above architecture is limited by the cut-off frequencies of the low-pass responses of the input transmission network 21 and the output transmission network 23. The bandwidth of a conventional lumped circuit amplifier is limited by its input or output pole frequency. The bandwidth of the distributed amplifier unit 20 provided in this embodiment and the bandwidth of the conventional lumped circuit amplifier are correspondingly described below by taking the output node as an example.

For the distributed amplifier unit 20 with N gain units 25, assuming that the output transmission network 23 is ideal and lossless and the characteristic impedance $Z_{0d}$ is equal to the resistance value $R_d$ of the output matching load 24, and the formulas for calculating the cut-off frequency $f_{cd}$ of the output transmission network 23 are:

$$Z_{0d} = \sqrt{L_d/C_{ds}}$$

and $$f_{cd} = \frac{1}{\pi \times \sqrt{L_d \times C_{ds}}}$$

According to the above formulas, it can be deduced that the relationship among the cut-off frequency $f_{cd}$ of the output transmission network 23, $Z_{0d}$, and $R_d$ is:

$$f_{cd} = \frac{1}{\pi \times Z_0 d \times C_{ds}} = \frac{1}{\pi \times R_d \times C_{ds}}$$

The formula for calculating the output pole frequency of a single gain cell is:

$$f_{pd0} = \frac{1}{2 \times \pi \times R_d \times C_{ds}}$$

In the conventional lumped circuit amplifier formed by direct connection of N gain units, the parasitic capacitance of the output node is enlarged by N times, so the formula for calculating the frequency $f_{pd}$ of the output pole is:

$$f_{pd} = \frac{1}{2 \times \pi \times R_d \times N \times C_{ds}} = \frac{1}{N} \times f_{pd0},$$

then $$\frac{f_{cd}}{f_{pd}} = \frac{2 \times \pi \times R_d \times N \times C_{ds}}{\pi \times R_d \times C_{ds}} = 2N$$

It can be seen that, as far as the output node is concerned, the cut-off frequency $f_{cd}$ of the output transmission network 23 provided in this embodiment is 2N times the output pole frequency $f_{pd}$ of the conventional lumped circuit amplifier, where N represents the number of the gain units 25. Similarly, it can be known that the cut-off frequency $f_{cg}$ of the input transmission network 21 provided in this embodiment is 2N times the input pole frequency $f_{pg}$ of the conventional lumped circuit amplifier. Therefore, the bandwidth of the distributed amplifier unit 20 provided in this embodiment is significantly higher than that of the conventional lumped circuit amplifier.

Further, according to the bandwidth calculation formula of the cascaded system, assuming that the same sub-circuits which of the bandwidths are both BW1 of N stages are cascaded, the bandwidth of the total cascaded system can be expressed as:

$$BW = BW1 \times \sqrt{N\sqrt{2} - 1}$$

When N≥2, the formula can be further approximated as:

$$BW \approx BW1 \times \frac{0.9}{\sqrt{N}}$$

It can be seen from the above formula that when the bandwidth BW1 of the cascaded system sub-circuits is fixed, the total cascaded system bandwidth BW is inversely proportional to the square root of the number of cascaded stages N, that is, as the number of stages increases, the total bandwidth becomes narrower. On the contrary, when the number of stages N is fixed, the total bandwidth BW is proportional to the sub-circuit bandwidth BW1, that is, when the sub-circuit bandwidth increases, the total system bandwidth also increases.

Therefore, in order to increase the bandwidth of the total cascaded system, the analog front-end module of the ultra-wideband optical receiver provided by the disclosure adopts the distributed amplifier unit 20, which can increase the sub-circuit bandwidth. Next, sub-circuits such as post-stage amplifiers, buffers, and variable gain amplifiers in the analog front-end module of the conventional optical receiver are integrated into the distributed amplifier unit 20, so that the number N of cascaded stages is reduced as much as possible. Through the improvement of the above two aspects, an ultra-wideband optical receiver architecture can be achieved.

Compared to the conventional analog front-end module of the optical receiver, in the analog front-end module of the ultra-wideband optical receiver provided in this embodiment, the distributed amplifier unit 20 is used to replace the conventional lumped circuit amplifier and then acts as the post-stage amplifier circuit, and the broadband characteristics of the distributed amplifier unit 20 and the functions of the distributed amplifier unit 20 are thus provided. That is, the functions of post-stage amplification, gain control, and output buffering are all available. The single-stage circuit bandwidth can be broadened, the number of circuit stages of the overall system can be reduced, and expansion of the overall bandwidth of the analog front end of the optical receiver is achieved.

In an embodiment, the gain units 25 of the distributed amplifier unit 20 may adopt common-emitter or common-source amplifying circuits, cascode amplifier circuits, or triple-stacked amplifier or more-stage stacked amplifier circuits. Each stage of the stacked amplifier circuit can be built using a bipolar transistor or a field-effect transistor. Further, each of the gain units 25 may also adopt a gain-controllable amplifier circuit such as a Gilbert unit, which can realize the gain control capability of the distributed amplifier unit.

In an embodiment, the input matching load 22 and the output matching load 24 may use resistors, and certainly, an architecture in which a capacitor and a resistor are connected in series may also be used. The specific architecture can be selected according to the actual situation, which is not limited in this embodiment.

To be specific, when the input matching load 22 adopts the resistor R1, the value of the resistor R1 can be comprehensively selected according to the output impedance value of the transimpedance amplifying unit 10, the characteristic impedance value of the input transmission network 21, the gain, and the matching requirements. If a higher gain is required, the value of the resistor R1 can be selected to be greater than the output impedance value of the transimpedance amplifying unit 10 and the characteristic impedance value of the input transmission network 21. Preferably, the value of the resistor R1 can be selected to be equal to the characteristic impedance of the input transmission network 21, so as to achieve the optimal matching effect.

When the output matching load 24 adopts the resistor R2, the value of the resistor R2 can be determined according to the characteristic impedance value of the output transmission network 23. Preferably, the value of the resistor R2 can be selected to be equal to the characteristic impedance of the output transmission network 23, so as to achieve the optimal matching effect.

In an embodiment, as shown in FIG. 2, both the input transmission network 21 and the output transmission network 23 in the distributed amplifier unit 20 can use several series-connected inductors, that is, the input transmission network 21 includes inductors Li1 to LiN+1, and the output transmission network 23 includes inductors Lo1 to LoN+1.

Herein, one end of the inductor Li1 located at a head end in the input transmission network 21 is connected to an output end of the transimpedance amplifying unit 10. One end of the inductor LiN+1 at a terminal end of the input transmission network 21 is grounded through the input matching load 22 (resistor R1). Connection points of two adjacent inductors in the input transmission network 21 are correspondingly connected to input ends of the gain units (transistors Q1 to QN). Connection points of two adjacent inductors in the output transmission network 23 are correspondingly connected to output ends of the gain units (transistors Q1 to QN). One end of the inductor Lo1 located at a head end in the output transmission network 23 is grounded through the output matching load 24 (resistor R2). One end of the inductor LoN+1 at a terminal end of the output transmission network 23 is connected to an external load.

In this embodiment, the inductors Li1 to LiN+1 in the input transmission network 21 are correspondingly resonated with the input parasitic capacitors of the transistors Q1 to QN in each of the gain units 25. Therefore, the influence of the input parasitic capacitor on the input bandwidth is reduced, and the cut-off frequency of the input transmission network 21 is enlarged. Likewise, the inductors Lo1 to LoN+1 in the output transmission network 23 are correspondingly resonated with the output parasitic capacitors of the transistors Q1 to QN in each of the gain units 25. Therefore, the influence of the output parasitic capacitor on the output bandwidth is reduced, and the cut-off frequency of the output transmission network 23 is enlarged. As previously stated, the bandwidth of the distributed amplifier unit 20 is limited by the cut-off frequencies of the input transmission network 21 and the output transmission network 23. Therefore, in this embodiment, the use of the input transmission network 21 and the output transmission network 23 in which several inductors are connected in series can effectively increase the cut-off frequency of the transmission network, thereby increasing the operating bandwidth of the distributed amplifier unit.

Figure 3:
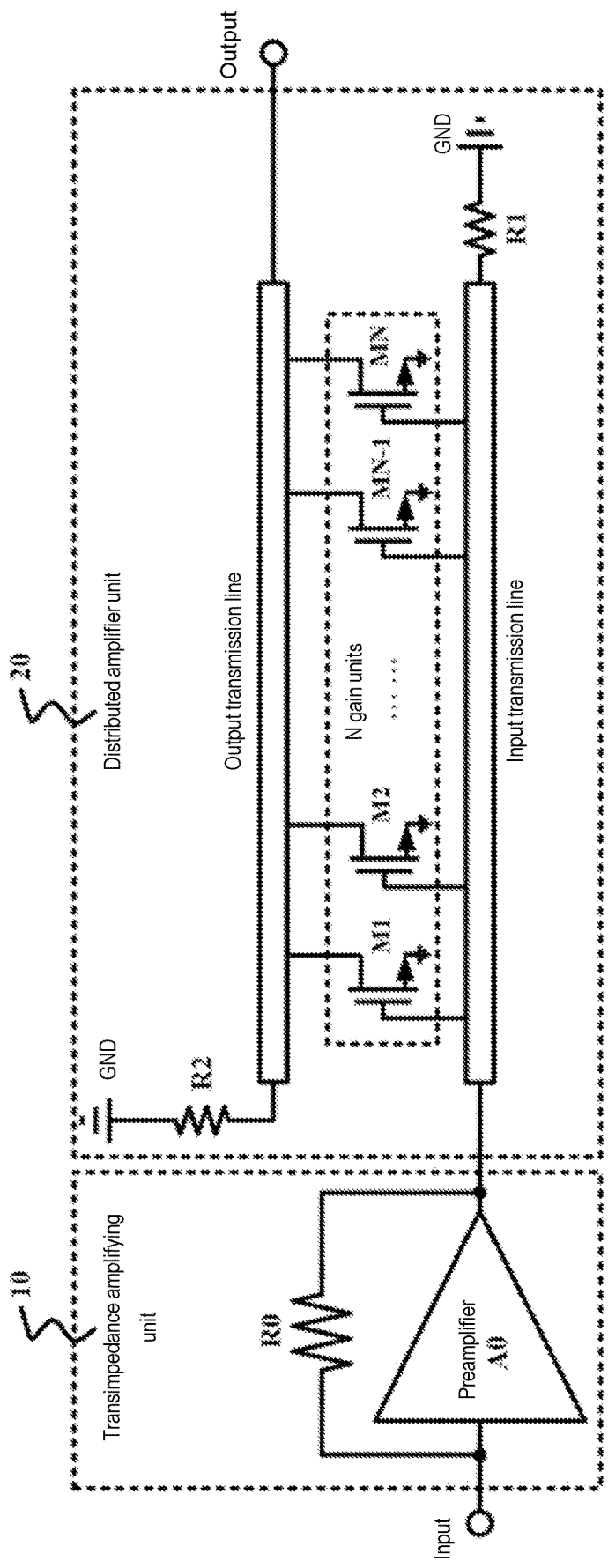
FIG. 3 is another schematic circuit diagram of the analog front-end module of the ultra-wideband optical receiver in FIG. 1.

In an embodiment, the input transmission network 21 and the output transmission network 23 in the distributed amplifier unit 20 may also use transmission lines. As shown in FIG. 3, that is, the input transmission network 21 adopts an input transmission line Z1, and the output transmission network 23 adopts an output transmission line Z2.

Herein, one end of the transmission line (input transmission line Z1) in the input transmission network 21 is connected to the output end of the transimpedance amplifying unit 10. The transmission line Z1 is connected to input ends of the gain units 25 (transistors M1 to MN). The other end of the input transmission line Z1 is grounded through the input matching load 22 (resistor R1). One end of the transmission line (output transmission line Z2) in the output transmission network 23 is grounded through the output matching load 24 (resistor R2). The output transmission line Z2 is connected to output ends of the gain units 25. the other end of output transmission line Z2 is connected to an external load.

In this embodiment, the input transmission network 21 and the output transmission network 23 employ transmission lines instead of the abovementioned inductors as devices that resonate with parasitic capacitors. Its operating principle is the same as the abovementioned operating principle of using an inductor, so description thereof is not repeated herein. That is, the effect of expanding the cut-off frequency of the input and output is also provided. Further, since the quality factor Q of the transmission line is greater at high frequencies, it is suitable for use in analog front-end modules of optical receivers operating at frequencies of tens of gigahertz or greater.

Therefore, when the analog front-end module of the optical receiver operates at a frequency of tens of gigahertz or greater, transmission lines can be preferably used as the input transmission network 21 and the output transmission network 23, and the following advantages are provided: (1) The transmission lines have no self-resonant frequency, while the self-resonant frequency of the inductor is generally around 100 GHz. Considering that the properties of the device change significantly around the self-resonant frequency, so the transmission lines are more suitable for applications at high frequencies. (2) According to the cut-off frequency formula of the transmission networks, higher frequencies need to correspond to lower inductance values. Due to shape limitations, inductors generally cannot provide inductance values of tens of picohenries or lower, but the shape of transmission lines is flexible and can provide lower inductance values. Therefore, the use of transmission lines is more in line with the requirements of high cut-off frequencies.

Considering that when the distributed amplifier unit 20 is used instead of the conventional lumped circuit amplifier as the post-stage amplifier circuit, since the input impedance of the distributed amplifier unit 20 is much lower than that of the conventional lumped circuit amplifier, the input impedance of the conventional lumped circuit amplifier is approximately infinite input impedance. As a result, when the same transimpedance amplifying unit 10 drives the back-end distributed amplifier unit 20, there is a problem that the overall cascaded gain decreases, resulting in a decrease in the output signal swing. Therefore, for the analog front-end module of the ultra-wideband optical receiver, which has higher requirements on the output signal swing, it is necessary to further improve the driving capability of the transimpedance amplifying unit 10.

Figure 4:
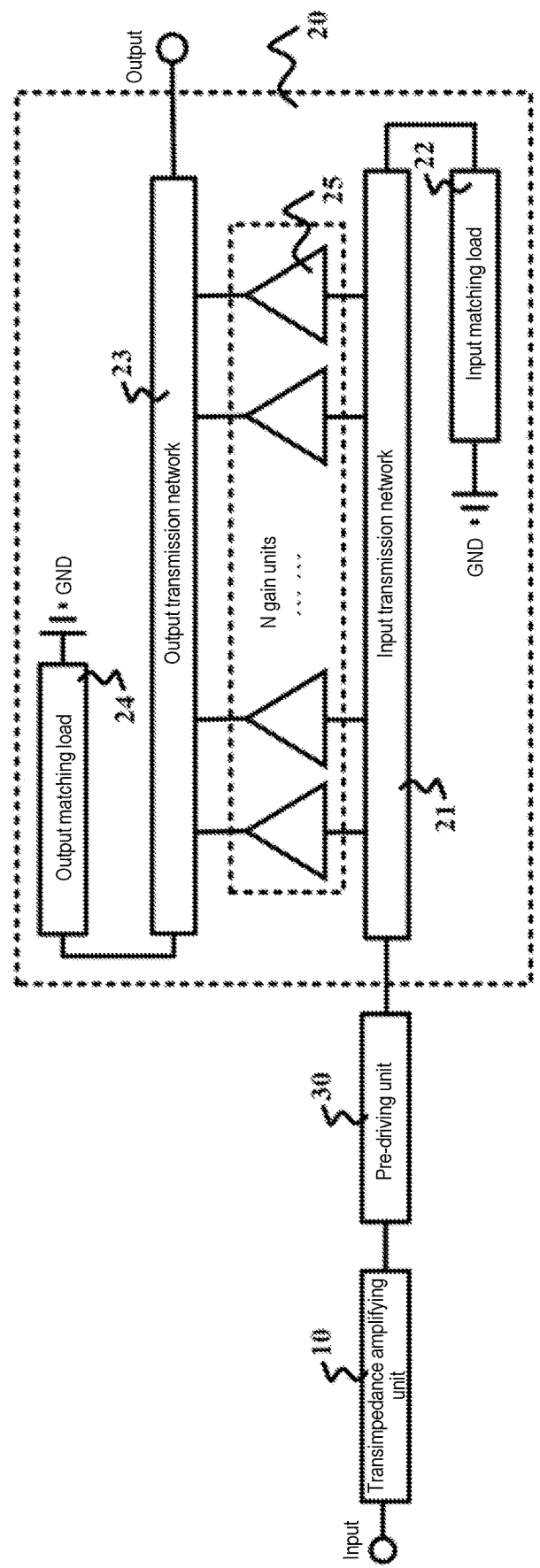
FIG. 4 is a structural diagram of an analog front-end module of an ultra-wideband optical receiver according to another embodiment of the disclosure.

In this regard, as shown in FIG. 4, the analog front-end module of the ultra-wideband optical receiver provided by the disclosure is additionally provided with a pre-driving unit 30 using a current mode logic (CML) circuit. The pre-driving unit 30 is connected to the transimpedance amplifying unit 10 and the distributed amplifier unit 20.

In this embodiment, the pre-driving unit 30 is configured to receive the voltage-amplified signal outputted by the transimpedance amplifying unit 10 and output a driving current signal. The load of pre-driving unit is multiplexed with the input matching load 22, and the driving current signal is converted into a driving voltage signal, which replaces the aforementioned voltage-amplified signal, and is distributed to each gain unit 25.

Figure 5:
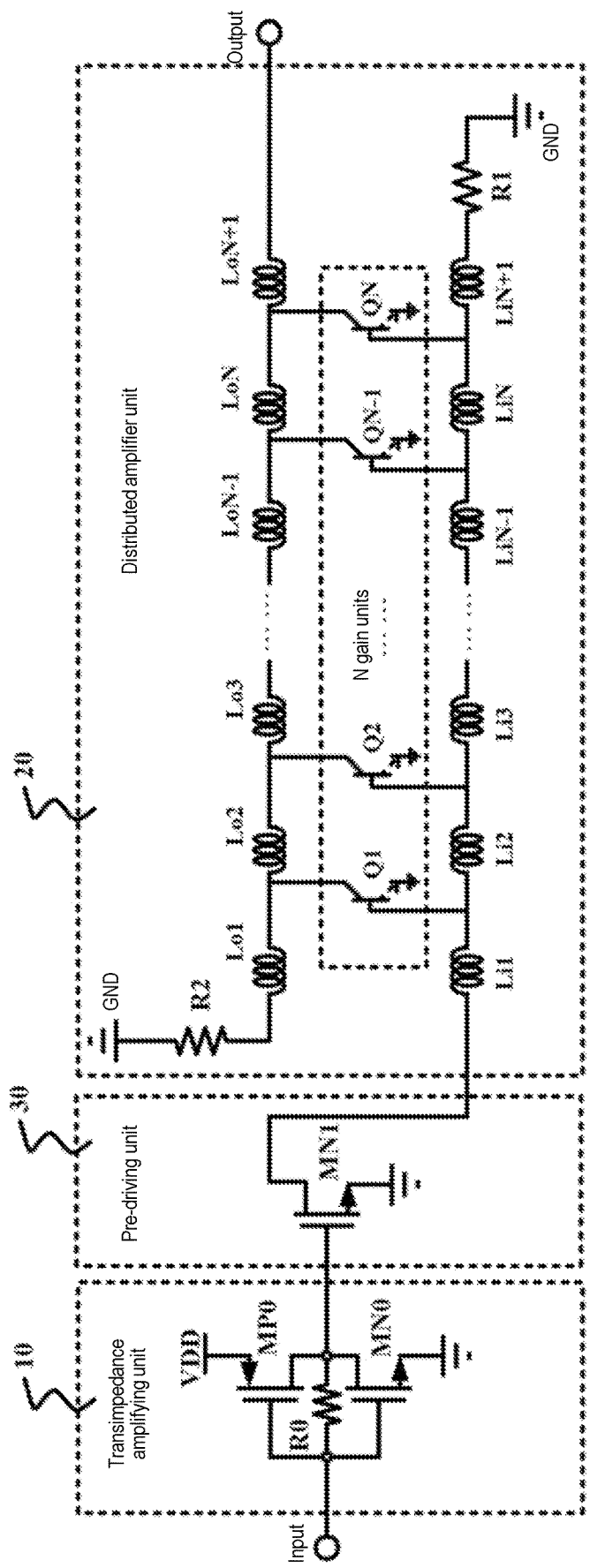
FIG. 5 is a schematic circuit diagram of the analog front-end module of the ultra-wideband optical receiver in FIG. 4.

To be specific, as shown in FIG. 5, the pre-driving unit 30 may use a MOS transistor or a BJT transistor. A gate terminal of the MOS transistor or a base terminal of the BJT transistor is connected to the output end of the transimpedance amplifying unit 10. A drain terminal of the MOS transistor or a collector of the BJT transistor is connected to the input transmission network 21. A source terminal of the MOS transistor or an emitter of the BJT transistor is grounded.

The pre-driving unit 30 provided in this embodiment mainly improves the driving capability of the transimpedance amplifying unit 10 from the following two aspects: (1) The input of the pre-driving unit 30 is the gate terminal of the MOS transistor or the base terminal of the BJT transistor, both of which have high input impedance. The amplitude of the signal outputted to the back-end distributed amplifier unit 20 may be increased. (2) The MOS transistor or BJT transistor used in the pre-driving unit 30 is a current mode logic circuit, which has a relatively high operating current and is favorable for driving a small impedance load. Based on the analysis of the above two points, the additional pre-driving unit 30 may be used to effectively improve the ability of the transimpedance amplifying unit 10 to drive a small impedance load. The problem of reduction in signal output amplitude caused by the gain reduction caused by the distributed amplifier unit architecture is thus overcome.

In the following, the analog front-end module of the ultra-wideband optical receiver provided with the pre-driving unit 30 provided by the disclosure will be described in detail with reference to specific embodiments.

As shown in FIG. 5, in this embodiment, the analog front-end module of the ultra-wideband optical receiver mainly includes three parts: the transimpedance amplifying unit (TIA) 10, the pre-driving unit 30, and the distributed amplifier unit 20.

Herein, the transimpedance amplifying unit 10 provided in this embodiment includes MOS transistors MN0 and MP0 and a feedback resistor R0. The feedback resistor R0 is connected between the input and output of the inverter to form a feedback loop, and the inverter composed of MOS transistors MN0 and MP0 is used to provide gain while suppressing input noise.

In this embodiment, the distributed amplifier unit 20 includes the gain units 25 formed by the bipolar transistors Q1 to QN, the input transfer network 21 formed by the inductors Li1 to LiN+1 and their corresponding input parasitic capacitors in the bipolar transistors Q1 to QN, the output transmission network 23 formed by the inductors Lo1 to LoN+1 and their corresponding output parasitic capacitors in the transistors Q1 to QN, and the input matching load 22 formed by the resistor R1 and the output matching load 24 formed by the resistor R2.

Herein, the bipolar transistors Q1 to QN act as the gain units 25 through common emitter connection to provide signal amplification. The resistor R1 is used to absorb the input signal (the driving current signal outputted by the pre-driving unit 30) to improve the input matching, prevent the input signal from being reflected to the transimpedance amplifying unit 10, and reduce the intra-stage crosstalk to the greatest extent. The functions of the input transmission network 21 are to receive the input signal and distribute the input signal to the each of the gain units 25. The functions of the output transmission network 23 are to superimpose and combine the amplified signals from the gain units 25 for output. The functions of the resistor R2 are to absorb the output signal transmitted to the left in FIG. 6 and prevent it from being reflected to the output port of the output transmission network 23. The reflected signal is in a different phase from the output signal transmitted to the right in FIG. 6, the quality of the signal may be significantly affected by the superposition of each other. Therefore, the resistor R2 can reduce the interference of the output signal transmitted to the left to the output signal transmitted to the right, and the quality of the output signal is improved.

In this embodiment, assuming that the input parasitic capacitance of each of the gain units 25 (bipolar transistors Q1 to QN) in the distributed amplifier unit 20 is $C_{gs}$, the inductance value of each inductor in the input transmission network 21 is $L_g$, the output parasitic capacitance is $C_{ds}$, and the inductance value of each inductor in the output transmission network 23 is $L_d$, according to the RLGC model of the transmission line, it can be obtained:

The equivalent impedance $Z_{0g}$ and the cut-off frequency $f_{cg}$ of the input transmission network 21 respectively are:

$$Z_{0g} = \sqrt{L_g/C_{gs}} \text{ and}$$

$$f_{cg} = \frac{1}{\pi \times \sqrt{L_g \times C_{gs}}}$$

The equivalent impedance $Z_{0d}$ and the cut-off frequency $f_{cd}$ of the output transmission network 23 respectively are:

$$Z_{0d} = \sqrt{L_d/C_{ds}}$$

and $$f_{cd} = \frac{1}{\pi \times \sqrt{L_d \times C_{ds}}}$$

The bandwidth of the distributed amplifier unit 20 is determined by the cut-off frequency $f_{cg}$ of the input transmission network 21 and the cut-off frequency $f_{cd}$ of the output transmission network 23. Therefore, it can be concluded from the above formulas that increasing the bandwidth of the distributed amplifier unit 20 can be achieved by reducing the inductance values $L_g$ and $L_d$ or the capacitance values $C_{gs}$ and $C_{ds}$. However, since the values of the capacitors $C_{gs}$ and $C_{ds}$ are determined by the processing technology of the circuit and the size of the transistor and cannot be arbitrarily set, so the bandwidth may be effectively increased by reducing the inductance values $L_g$ and $L_d$. However, decreasing the inductance values $L_g$ and $L_d$ may cause the equivalent impedances $Z_{0g}$ and $Z_{0d}$ to decrease rapidly, and as a result, the gain of the distributed amplifier unit 20 decreases rapidly and the distributed amplifier unit 20 becomes more difficult to be driven by the pre-stage. Therefore, it is necessary to increase the driving capability of the front-stage transimpedance amplifying unit 10 in exchange for a high operating frequency of the distributed amplifier unit 20.

In this regard, in this embodiment, the pre-driving unit 30 is added at the rear end of the transimpedance amplifying unit 10 and the front end of the distributed amplifier unit 20. The pre-driving unit 30 includes a MOS transistor MN1. The gate input of the MOS transistor MN1 is connected to the output end of the inverter, and the drain terminal thereof is connected to the input transmission network 21 in the distributed amplifier 20. Further, the pre-driving unit 30 directly multiplexes the input matching load 22 in the distributed amplifier 20 as its own load, so that the driving efficiency may be maximized.

FIG. 6 is a comparison chart of simulation results of output swing amplitudes of the combination of a transimpedance amplifying unit (TIA) and different post-stage circuits according to the disclosure. The simulation results obtained in FIG. 6 show that the output swing of the analog front-end module of the ultra-wideband optical receiver (e.g., the pre-driving TIA + distributed amplifier unit shown in FIG. 6) added with the pre-drive function is basically the same as that provided by the conventional TIA cascaded lumped circuit amplifier architecture (e.g., the TIA+lumped amplifier shown in FIG. 6). The output swing of the above-mentioned analog front-end module of the ultra-wideband optical receiver without the pre-driving function (e.g., the TIA+distributed amplifier unit as shown in FIG. 6) is only about 71% of the previous two.

Figure 7:
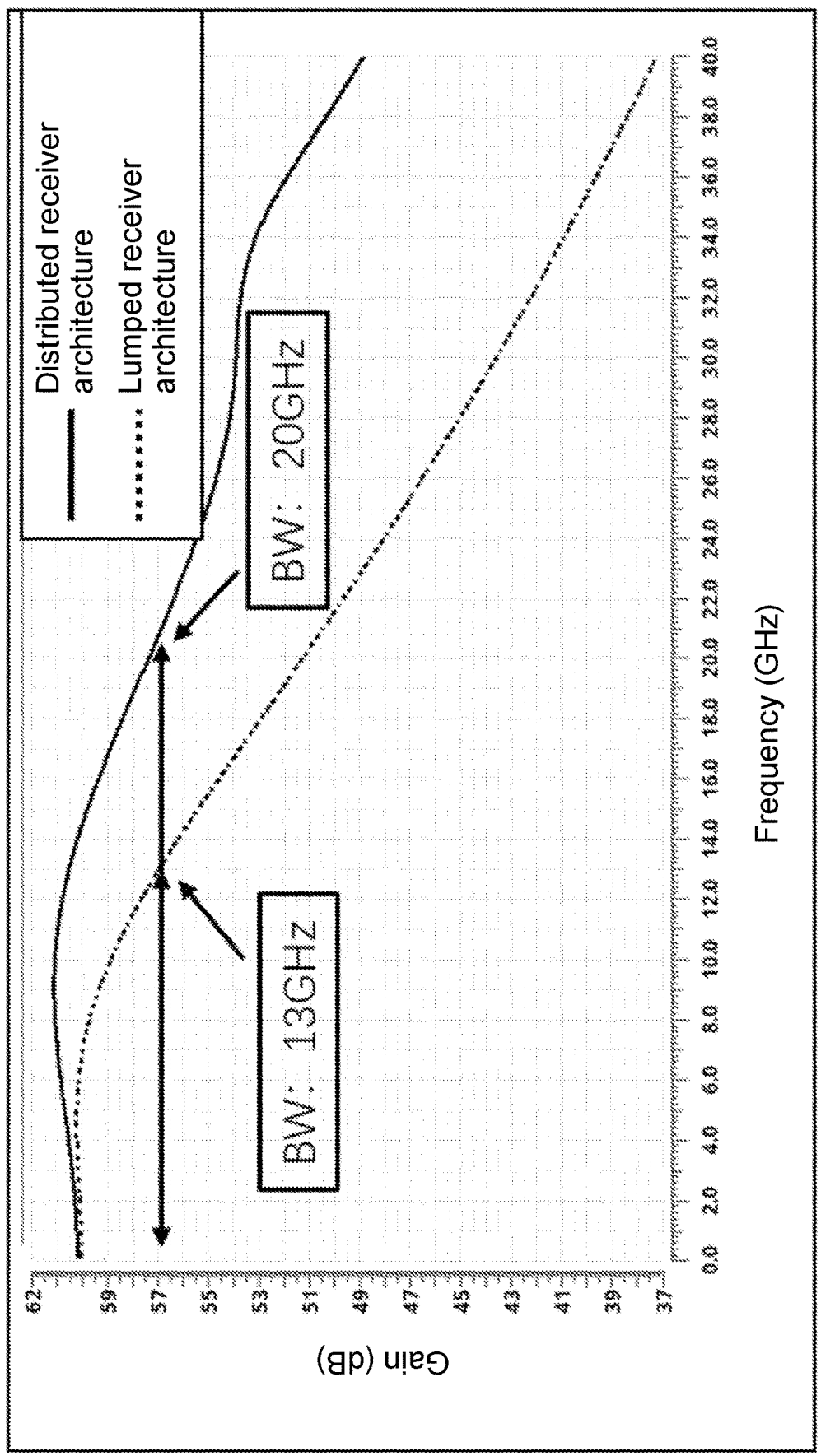
FIG. 7 is a comparison chart of overall cascaded bandwidth simulation results of the analog front-end module of the ultra-wideband optical receiver (distributed receiver) and a conventional lumped receiver according to the disclosure.
Figure 8:
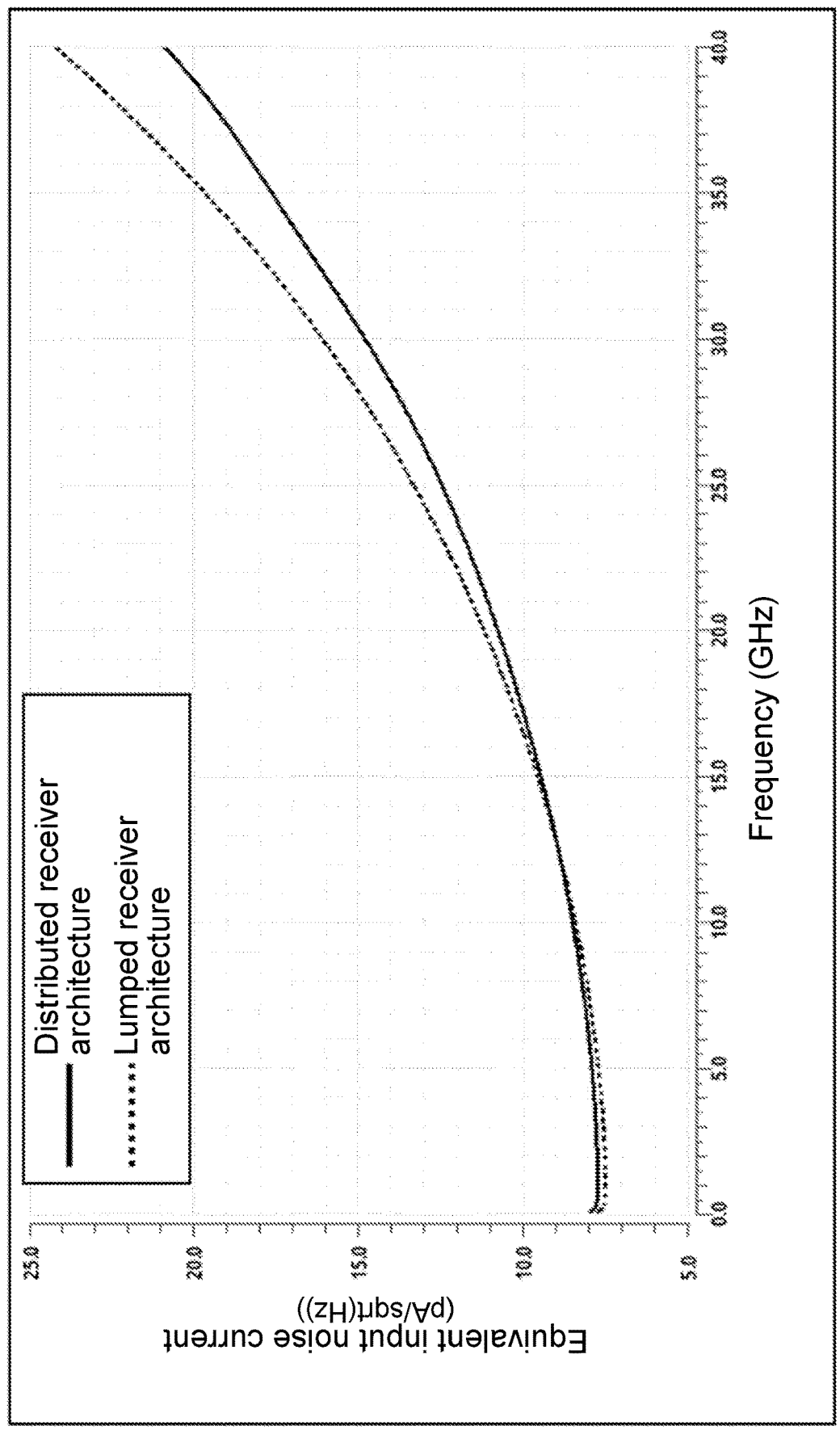
FIG. 8 is a comparison chart of the simulated noise performance results of the analog front-end module of the ultra-wideband optical receiver (distributed receiver) and the conventional lumped receiver according to the disclosure.

FIG. 7 is a comparison chart of the overall cascaded bandwidth simulation results of the analog front-end module of the ultra-wideband optical receiver (also known as a distributed receiver) and a conventional lumped receiver according to the disclosure. It can be seen from FIG. 7 that under the same process parameters and the same transimpedance amplifying unit structure, compared to the bandwidth performance of the lumped receiver, the small-signal bandwidth performance of the analog front-end module of the ultra-wideband optical receiver provided by the disclosure is enhanced by approximately 54%. FIG. 8 is a comparison chart of the noise performance simulation results of the analog front-end module of the ultra-wideband optical receiver (distributed receiver) and the conventional lumped receiver according to the disclosure. It can be seen from FIG. 8 that due to the use of the same transimpedance amplifying unit structure, the input noise index, acting as another key index of the receiver, does not deteriorate.

In view of the foregoing, in the analog front-end module of the ultra-wideband optical receiver provided by the disclosure, the distributed amplifier unit is used to replace the conventional lumped circuit amplifier and then acts as the post-stage amplifier circuit, and the broadband characteristics of the distributed amplifier unit and the functions of the distributed amplifier unit are thus provided. That is, the functions of post-stage amplification, gain control, and output buffering are all available. The single-stage circuit bandwidth can be increased, the number of circuit stages of the overall system can be reduced, and expansion of the overall bandwidth of the analog front end of the optical receiver is achieved.

A person having ordinary skill in the art should be able to easily understand that the above description is only preferred embodiments of the disclosure and is not intended to limit the disclosure. Any modifications, equivalent replacements, and modifications made without departing from the spirit and principles of the disclosure should fall within the protection scope of the disclosure.

What is claimed is:

1. An analog front-end module of an ultra-wideband optical receiver, comprising:
a transimpedance amplifying unit configured to convert an externally-inputted current signal into a voltage signal, amplify the voltage signal, and then output a voltage-amplified signal; and
   a distributed amplifier unit comprising an input transmission network, an input matching load, an output transmission network, an output matching load, and a plurality of gain units, wherein the input transmission network is configured to receive the voltage-amplified signal and distribute the voltage-amplified signal to each gain unit for further amplification, the input matching load is configured to absorb the voltage-amplified signal reflected to the transimpedance amplifying unit, the output transmission network is configured to superimpose amplified signals outputted from the plurality of gain units and output in combination, and the output matching load is configured to absorb the amplified signals transmitted from the plurality of gain units to an output end of the output transmission network in an opposite direction.

2. The analog front-end module of the ultra-wideband optical receiver according to claim 1, wherein the transimpedance amplifying unit comprises an inverter and a feedback resistor R0, and the feedback resistor R0 is connected in parallel with the inverter.

3. The analog front-end module of the ultra-wideband optical receiver according to claim 1, wherein each of the input transmission network and the output transmission network comprises a plurality of series-connected inductors, wherein one end of the inductor located at a head end in the input transmission network is connected to an output end of the transimpedance amplifying unit, one end of the inductor at a terminal end of the input transmission network is grounded through the input matching load, connection points of two adjacent inductors in the input transmission network are correspondingly connected to input ends of the plurality of gain units, connection points of two adjacent inductors in the output transmission network are correspondingly connected to output ends of the plurality of gain units, one end of the inductor located at a head end in the output transmission network is grounded through the output matching load, and one end of the inductor at a terminal end of the output transmission network is connected to an external load.

4. The analog front-end module of the ultra-wideband optical receiver according to claim 1, wherein both the input transmission network and the output transmission network use transmission lines, wherein one end of the transmission line in the input transmission network is connected to an output end of the transimpedance amplifying unit, the transmission line in the input transmission network is connected to input ends of the plurality of gain units, the other end of the transmission line in the input transmission network is grounded through the input matching load, one end of the transmission line in the output transmission network is grounded through the output matching load, the transmission line in the output transmission network is connected to output ends of the plurality of gain units, and the other end of the transmission line in the output transmission network is connected to an external load.

5. The analog front-end module of the ultra-wideband optical receiver according to claim 1, wherein the plurality of gain units use several stages of stacked amplifier circuits, and each stage of the stacked amplifier circuits comprises a bipolar transistor or a field-effect transistor.

6. The analog front-end module of the ultra-wideband optical receiver according to claim 1, wherein the plurality of gain units are Gilbert units.

7. The analog front-end module of the ultra-wideband optical receiver according to claim 1, wherein the input matching load comprises a resistor R1, and an impedance of the input matching load is equal to a characteristic impedance of the input transmission network.

8. The analog front-end module of the ultra-wideband optical receiver according to claim 1, wherein the output matching load comprises a resistor R2, and an impedance of the output matching load is equal to a characteristic impedance of the output transmission network.

9. The analog front-end module of the ultra-wideband optical receiver according to claim 1, further comprising a pre-driving unit adopting a current mode logic circuit, wherein the pre-driving unit is configured to receive the voltage-amplified signal and output a driving current signal, the driving current signal is multiplexed with the input matching load, and the driving current signal is converted into a driving voltage signal and distributed to each gain unit.

10. The analog front-end module of the ultra-wideband optical receiver according to claim 9, wherein the current mode logic circuit comprises a MOS transistor or a BJT transistor, a gate terminal of the MOS transistor or a base terminal of the BJT transistor is connected to an output end of the transimpedance amplifying unit, a drain terminal of the MOS transistor or a collector of the BJT transistor is connected to the input transmission network, and a source terminal of the MOS transistor or an emitter of the BJT transistor is grounded.

\* \* \* \* \*